(12) United States Patent
Schneider

(10) Patent No.: US 7,195,032 B2
(45) Date of Patent: Mar. 27, 2007

(54) UNIDIRECTIONAL, ADJUSTABLE FLAP VALVES

(75) Inventor: Jonathan Schneider, Zikhron Yaaqov (IL)

(73) Assignee: Beth-el Zikhron-Ya'Aqov Industries, Ltd, Zikhron Yaaqov (IL)

( * ) Notice: Subject to any disclaimer, the term of this patent is extended or adjusted under 35 U.S.C. 154(b) by 183 days.

(21) Appl. No.: 10/765,179

(22) Filed: Jan. 28, 2004

(65) Prior Publication Data
US 2004/0182449 A1    Sep. 23, 2004

(30) Foreign Application Priority Data
Jan. 30, 2003   (IL) .................................... 154198

(51) Int. Cl.
*F16K 15/03* (2006.01)
(52) U.S. Cl. ................... 137/527; 137/527.4; 251/337
(58) Field of Classification Search ................ 137/527, 137/527.4; 251/337
See application file for complete search history.

(56) References Cited

U.S. PATENT DOCUMENTS

| | | | | |
|---|---|---|---|---|
| 2,767,735 A | * | 10/1956 | Darling | ........................ 137/527 |
| 3,172,424 A | * | 3/1965 | Stillwagon | ............... 137/527.4 |
| 3,665,958 A | * | 5/1972 | Dunkelis | ..................... 137/522 |
| 3,974,855 A | * | 8/1976 | Webb | ........................ 137/527.4 |
| 3,990,471 A | * | 11/1976 | Schutzer et al. | ............. 137/527 |
| 4,088,150 A | * | 5/1978 | Serratto | ...................... 137/499 |
| 4,678,341 A | * | 7/1987 | Stuckey | ....................... 366/142 |
| 5,494,244 A | | 2/1996 | Walton | ....................... 248/27.1 |
| 6,705,593 B2 | * | 3/2004 | Deaton | ......................... 251/303 |

FOREIGN PATENT DOCUMENTS

| | | |
|---|---|---|
| DE | 3540264 A1 | 5/1987 |
| DE | 19849863 A1 | 5/1999 |
| EP | 0864821 A2 | 9/1998 |
| GB | 2330772 A * | 5/1999 |

* cited by examiner

*Primary Examiner*—Ramesh Krishnamurthy
(74) *Attorney, Agent, or Firm*—Jacobson Holman PLLC

(57) ABSTRACT

The invention provides a flap valve for controlling the air pressure within a protected space defined by walls, the flap valve including a valve frame attachable to an opening made in the walls, a valve flap, articulated at least indirectly to the frame and being subjectable to both a sealing force which forces the valve flap against the valve frame and to an opening force which lifts a portion of the flap off the valve frame; the flap valve having a first position in which the protected space is sealed off from a contaminated environment, and a second position in which air from the protected space is allowed to escape into the environment via the opening, wherein the sealing force is constituted by at least one spring at least indirectly attached to the valve flap and the valve frame.

7 Claims, 2 Drawing Sheets

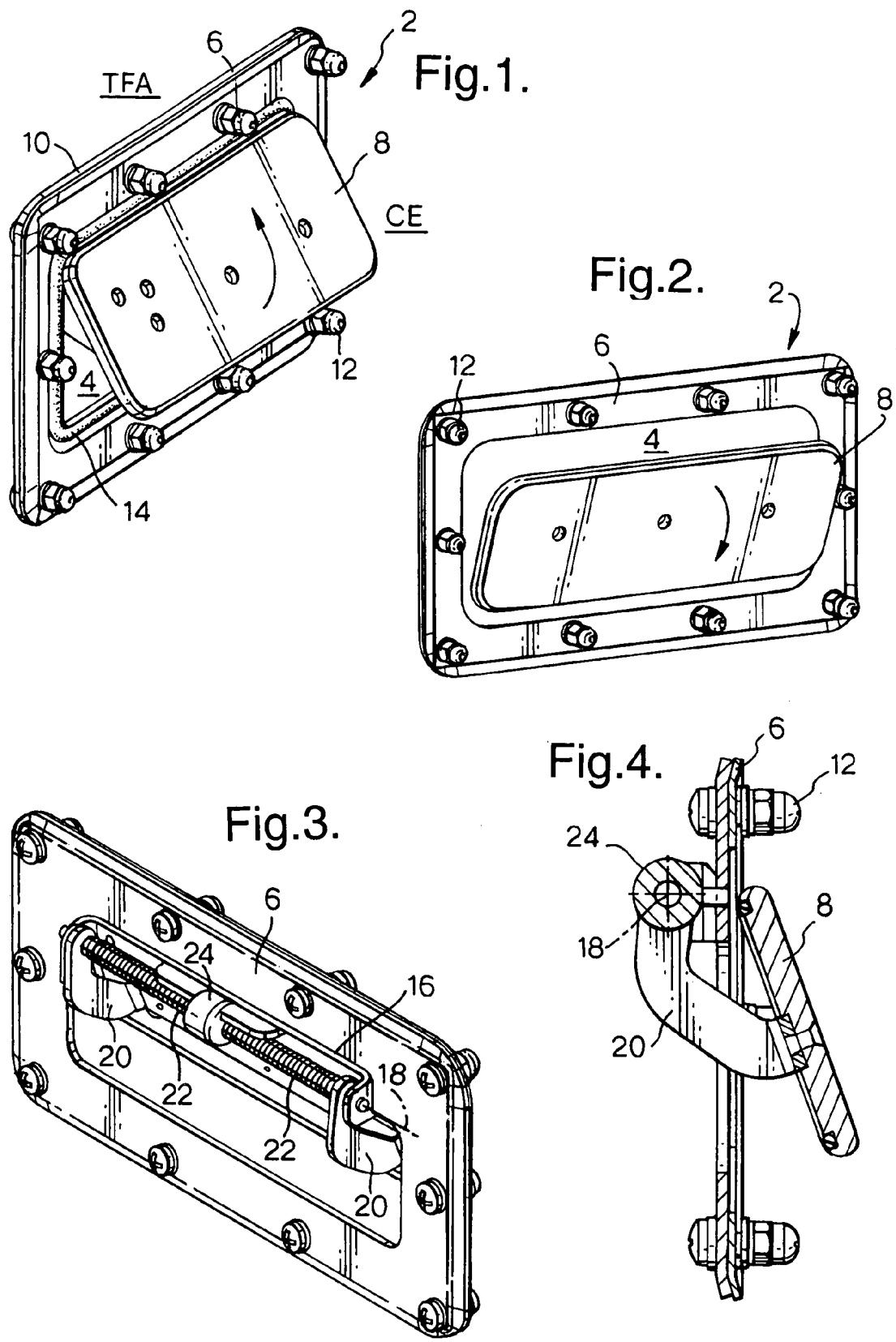

UNIDIRECTIONAL, ADJUSTABLE FLAP VALVES

FIELD OF THE INVENTION

The present invention relates to a valve for controlling the air pressure within a protected space defined by wall surfaces. More particularly, the invention relates to a flap valve to be used in a structure for preventing the penetration of contaminated air and/or gases, liquids or aerosols, and for controlling air pressure within such a protected space.

BACKGROUND OF THE INVENTION

As is known, there is an increasing need for protection against the penetration of contaminants into a sheltered space, given the threat of military attacks and acts of terror using nuclear, chemical or biological (NBC) means of warfare. Such protection is provided by the use of shelters and protected spaces located inside buildings ("hard" shelters), or tent structures ("soft" shelters). Hard shelters are provided with professional NBC air filtration systems including blowers, which create an overpressure inside the protected space and provide cleaned and filtered air. The overpressure is required in order to ensure a clear direction of airflow from inside the protected space to the outside atmosphere, through ever-present leaks in the walls of the shelter, the door and the window seals. Use of this method makes sure that no contaminated air will penetrate into the protected space.

In a typical soft-type shelter, clean, NBC-filtered air is pushed by blowers into the tent, with excess air passing to the outside through leaks or specially created holes in the walls of the tent. The disadvantage of such an arrangement is that, during times when no fresh air is pumped into the protected space, e.g., during a blower breakdown, the essential overpressure immediately drops, with two dire results: contaminated air can enter the protected space via the air exit holes, and, if the protected space is in fact an inflated structure, the internal liner bubble may collapse, trapping inside all of the persons and goods to be protected. If these structures had closable valves, none of the above failures would be able to occur and the system would remain intact for a prolonged period of time until the clean air supply resumes and creates the required overpressure.

DISCLOSURE OF THE INVENTION

It is therefore a broad object of the present invention to provide both hard and soft protected shelter structures with valves for controlling air pressure that are reliable, inexpensive and easily installed.

It is a further object of the present invention to overcome the disadvantages of the fresh-air supplied prior-art protected spaces and structures, and to provide such structures with valving arrangements that will either act as safety valves to protect the space against excessive overpressure, or to close off the protected space in the event of an air supply system failure until sufficient pressure has been rebuilt, or to operate as simple non-return valves.

The terms "protected space" and "structures" used herein are meant to encompass all types of such spaces and structures, including vehicles which may provide shelters against NBC attacks.

According to the invention, the above objects are achieved by providing a flap valve for controlling the air pressure within a protected space defined by walls, said flap valve comprising a valve frame attachable to an opening made in said walls, a valve flap, articulated at least indirectly to said frame and being subjectable to both a sealing force which forces said valve flap against said valve frame and to an opening force which lifts a portion of the flap off said valve frame; said flap valve having a first position in which said protected space is sealed off from a contaminated environment, and a second position in which air from said protected space is allowed to escape into said environment via said opening; wherein said sealing force is constituted by at least one spring at least indirectly attached to said valve flap and said valve frame.

BRIEF DESCRIPTION OF THE DRAWINGS

The invention will now be described in connection with certain preferred embodiments with reference to the following illustrative figures, so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a perspective outside view of a flap valve according to the present invention, swivelling in an upward direction;

FIG. 2 is a perspective outside view of a flap valve according to the present invention, swivelling in a downward direction;

FIG. 3 is a perspective inside view of a first embodiment of a flap valve according to the invention;

FIG. 4 is a cross-sectional view of the flap valve of FIG. 3;

FIG. 5 is a perspective inside view of a second embodiment of the flap valve according to the present invention;

FIG. 6 is a plane inside view of the flap valve of FIG. 5, showing a first state of adjustment of the opening force, and FIG. 7 is a plane inside view of the flap valve of FIG. 5, showing a second state of adjustment of the opening force.

DETAILED DESCRIPTION OF PREFERRED EMBODIMENTS

Figure 5:
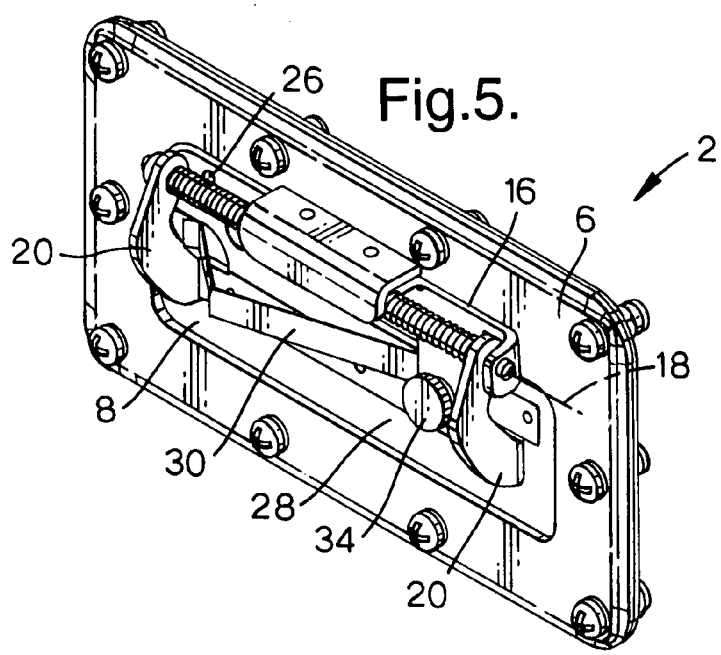

Referring now to the drawings, FIGS. 1 and 2 illustrate a flap valve 2 for an NBC-protected hard or soft structures (or shelters), which may be defined by rigid walls, semi-rigid walls, flexible walls, or a combination thereof, and is provided with a window 4, in which the flap valve 2 is installed. By opening the valve covering the window 4, any excess pressure can exit from the structure through the window from the toxic-free area (TFA) to the contaminated environment (CE).

The flap valve 2 is composed of a frame 6 and a flap 8. The frame is made with flanges 10, whereby the frame is attached to the wall of the structure by means of bolts and nuts 12. If the wall is made of a plastic material, attachment may be effected by ultrasonic welding, or by other joining methods, e.g., gluing.

As further seen in FIGS. 1 and 2, the flap 8, which is hingedly coupled to the frame 6, can be articulated to swing upwardly (FIG. 1) or downwardly (FIG. 2) according to choice. The flap 8 and/or the frame 6 may advantageously be furnished with a sealing ring 14. The material from which the flap 8 is made is predetermined not only in consideration of strength and durability, but also in consideration of its own weight, as will be explained hereinafter.

A first embodiment of the articulation of the flap valve 2, seen in FIG. 1 for controlling the air pressure within a protected space, is shown in FIGS. 3 and 4. A U-shaped bracket 16, affixed to the valves frame 6, supports an axis 18. To the latter there is attached flap hinge elements 20. Two torsion spring sections 22 are slipped over the axis 18, one end of each of the spring sections being attached to a flap hinge element 20, while the other end is attached to one side of a spring torsion adjustment revolving member 24 also mounted on the axis 18. Per-se known means (not shown) for affixing the member 24 at a set angular position is also provided.

Figure 6:
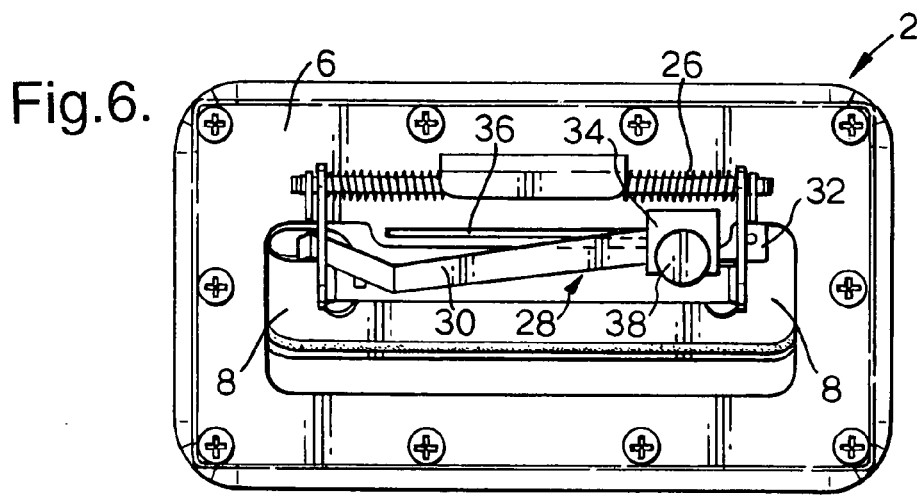
Figure 7:
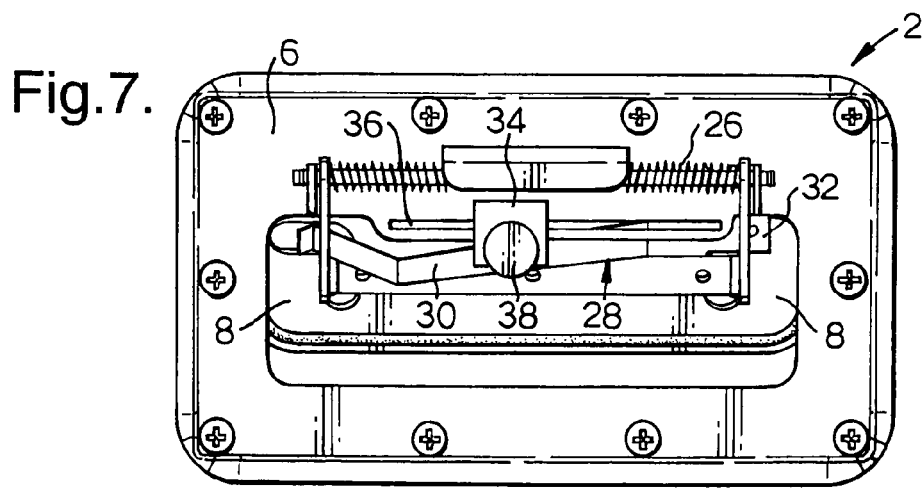

A second embodiment of the flap valve 2 for controlling the air pressure within a protected space, is illustrated in FIGS. 5 to 7. Seen is the valves frame 6, the flap 8, as articulated to the frame 6 by means of the bracket 16, supporting the axis 18 and the flap hinge elements 20. The adjustment of the pressure required to move the hinged flap 8 beyond its initial state as determined, inter alia, by the force of the spring 26 and the flap's own weight, is provided by a slider arrangement 28. The latter consists of a bent leaf spring 30 affixed at one end 32 to one side of the flap 8, while bearing against the flap 8 at its other end. A slider 34, coupled to, and guided by, a slot 36 made in the frame 6, can be manually slid along the leaf spring 30 from one limit position near the leaf spring end 32 (FIGS. 5 and 6), to an intermediate position (FIG. 7) and beyond to the other end of the leaf spring 30. At any set position a thumb screw 38 locks the slider to prevent its movement, thereby determining the spring force applied to the flap beyond the initial force applied by the spring 26.

The valves according to the present invention thus have three modes of operation:

a) Standard mode—wherein the valve is prefixed to a certain overpressure valve, thereby the valve keeps a certain maximum pressure in a protected space;

b) Seal mode—in case of a blower problem or maintenance of the filters/blowers, the valve can be used to seal the protected space, and c) Protect mode—when blowers are started, the valve protects soft shelters from bursting even when the valve is not set back from the seal mode.

Since the valves of the present invention have the characteristics of providing constant overpressure, e.g., 300 to 320 Pa, it can be used in shelters and vehicles, as it opens only when the preset pressure value is reached and not earlier. Any leakage of the protected space is therefore limited to that of real leaks.

With the utilization of the embodiments described hereinbefore, the following specific operation features can be achieved:

1. Valve 2 is opened against the force of torsion of a spring or springs until completely open. The pressure in the space decreases by less than 10%. The flap 8 has a rotation axis upwards (FIG. 1).

2. Valve 2 is opened against torsion spring(s), but the weight of the flap 8 compensates for the force of the spring, hence the pressure is constant. The flap 8 has the rotation axis downwards (FIG. 2).

3. Valve 2 is opened against the torsion spring(s), however, the weight of the flap 8 overcompensates the increase of the spring force. The valves open completely at a certain pressure point, resulting in a pressure drop. The flap 8 has the rotation axis downwards.

4. Valve 2 is opened against a bent spring 30 (FIGS. 5 to 7) at a certain pressure with a constant increase of pressure, until it is completely open. The spring force is selected as constant. The flap 8 can have a rotation axis upwards or downwards.

5. Valve 2 is opened against a bent spring 30 at a certain pressure and is opened completely immediately. The spring force is selected as decreasing. The flap 8 can have a rotation axis upwards or downwards.

6. Valve 2 is opened manually against the spring force by means of a slider 34, to reach a certain pressure in the space and could be closed by the spring force when the slider 34 is pushed back to the start position.

7. Combined feature (sealed and burst pressure protection) as in 6 above, however, in the sealed condition, the valve 2 will be opened by an overpressure (below the burst pressure but above the working pressure) against the spring force, as described in points 1 to 5.

8. Combined features of sealed and regulated pressure—a predefined pressure is achieved by a manual change of the preset force of the torsion spring 16 (instead of the use of a slider). The opening of the valve 2 will occur when the working pressure exceeds the setting of the spring force (features 1 to 5 above), and 9. With an additional spring 30 between the slider 34 and flap 8, the valve 2 could be used as a non-return valve (spring 7). Thus, a gust of wind would close the valve and protect the inside from contamination. This will be achieved with feature 8, without an additional spring.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A flap valve for controlling the air pressure within a protected space defined by walls, said flap valve comprising:

a valve frame attachable to an opening made in said walls, a valve flap, articulated at least indirectly to said frame and being subjectable to both a sealing force which forces said flap against said valve frame and to an opening force which lifts a portion of the flap off said valve frame;

said flap valve having a first position in which said protected space is sealed off from a contaminated environment, and a second position in which air from said protected space is allowed to escape into said environment via said opening;

at least one spring at least indirectly attached to said valve flap and said valve frame and located in a plane substantially parallel to the plane of said valve frame, and bent leaf spring extending along one surface of said flap and affixed at one end to said flap while freely bearing against the flap at its other end, and a slider coupled to a slot in the frame and movable along said bent leaf to vary the opening force applied to the surface of said flap.

2. The flap valve as claimed in claim 1, wherein said valve frame is composed of two juxtapositioned plates attachable to opposite surfaces of wall portions surrounding said opening, by clamping said plates together.

3. The flap valve as claimed in claim 1, wherein said at least one spring is a torsion spring.

4. The flap valve as claimed in claim 3, wherein said spring is slipped over an axis at least indirectly affixed to said frame.

5. The flap valve as claimed in claim 4, wherein said flap is hinged to said axis.

6. The flap valve as claimed in claim 3, further comprising means for adjusting the torsion force of said at least one spring.

7. The flap valve as claimed in claim 1, further comprising a thumb screw for manually affixing said slider along said leaf spring at a present point.

* * * * *